United States Patent [19]

Van Doorn et al.

[11] 3,744,361

[45] July 10, 1973

[54] PROCESS AND APPARATUS FOR CUTTING ELONGATED MATERIAL

[75] Inventors: Donald W. Van Doorn; James B. Hawkins, both of Columbus, Ga.

[73] Assignee: Lummus Industries, Inc., Columbus, Ga.

[22] Filed: Feb. 8, 1971

[21] Appl. No.: 113,124

[52] U.S. Cl............................ 83/37, 83/58, 83/62, 83/67, 83/346, 83/348, 83/522, 83/543, 83/564, 83/913
[51] Int. Cl........................... B26d 1/36, B26d 1/40
[58] Field of Search ................... 83/20, 21, 37, 346, 83/348, 58, 62, 67, 522, 564, 913, 543

[56] References Cited
UNITED STATES PATENTS

| | | | |
|---|---|---|---|
| 3,508,461 | 4/1970 | Stream............................. | 83/913 X |
| 3,557,648 | 1/1971 | Coffin et al......................... | 83/20 X |
| 3,074,303 | 1/1963 | Waters............................ | 83/348 X |
| 3,347,123 | 10/1967 | Worner et al........................ | 83/346 |
| 3,485,120 | 12/1969 | Keith ................................. | 83/346 X |

*Primary Examiner*—Frank T. Yost
*Attorney*—Jennings, Carter & Thompson

[57] ABSTRACT

A process and apparatus for cutting elongated material into shorter, predetermined lengths which is an improvement upon the same shown, described and claimed in U.S. Pat. No. 3,485,120, issued Dec. 23, 1969. The present process includes the steps of determining the existence of more than a predetermined cutting pressure exerted on the material in order to ascertain if the machine is operating properly and, additionally, to use such increase in pressure to stop the cutting operation as when the cutting blades become dull, when knots pass through the apparatus, or upon improper installation of a cutter, and so forth. The apparatus includes means to exert a cutting pressure against the material and means quickly to move said pressure means into and out of operative position when desired.

11 Claims, 9 Drawing Figures

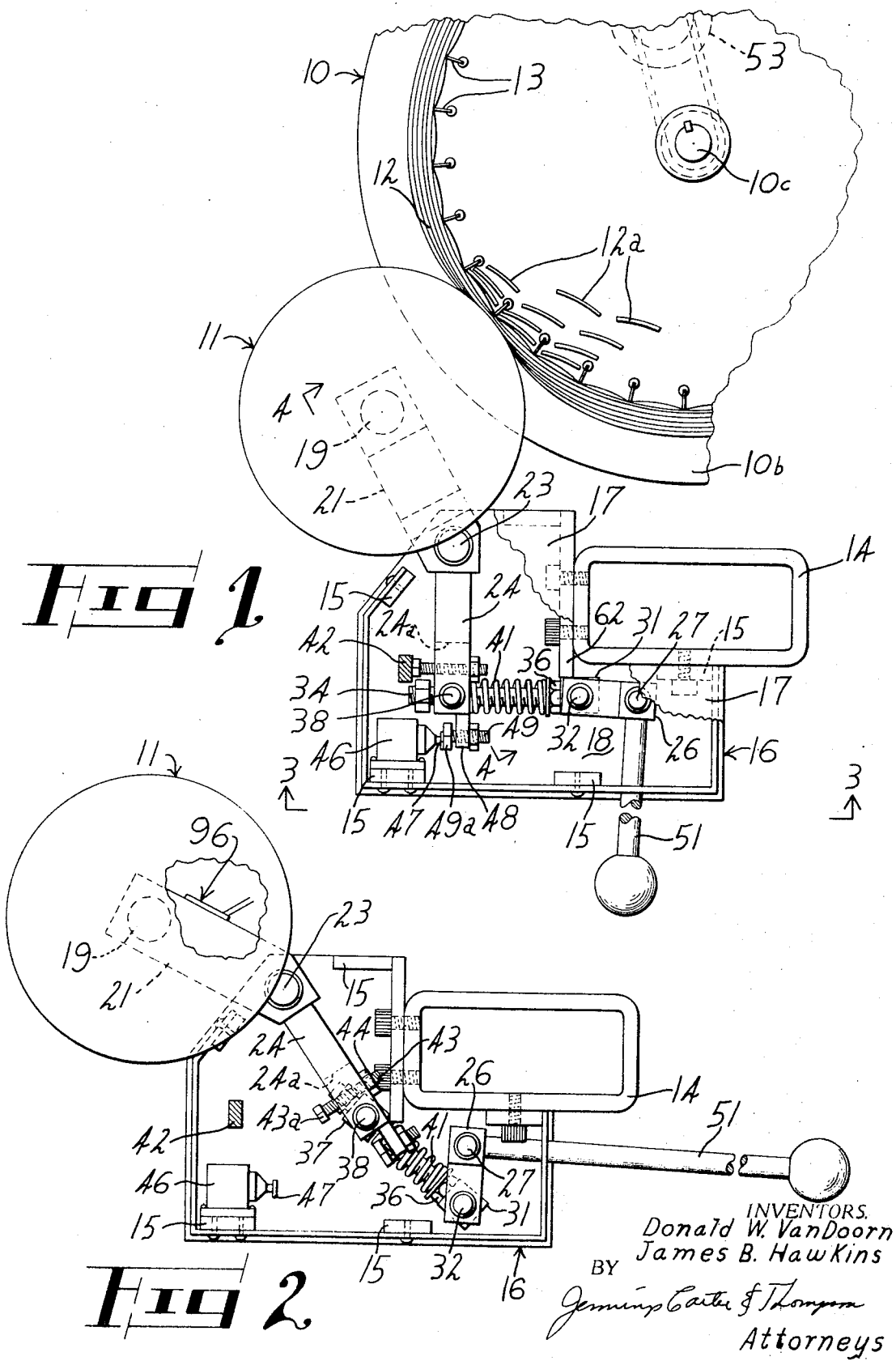

Patented July 10, 1973

INVENTORS.
Donald W. VanDoorn
James B. Hawkins
BY
Jennings Carter & Thompson
Attorneys

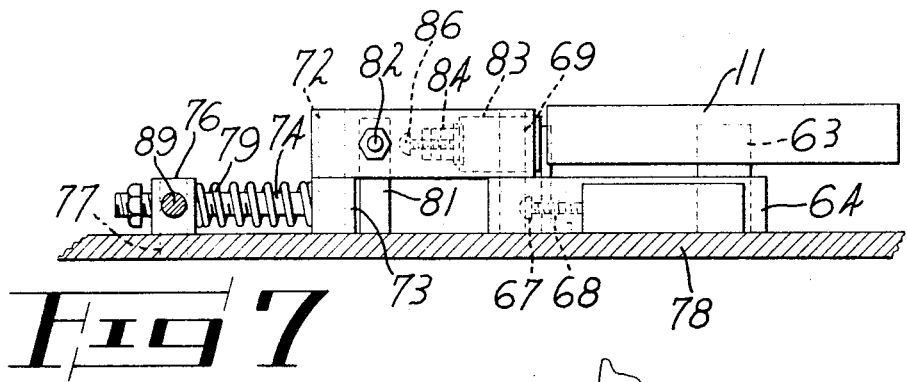
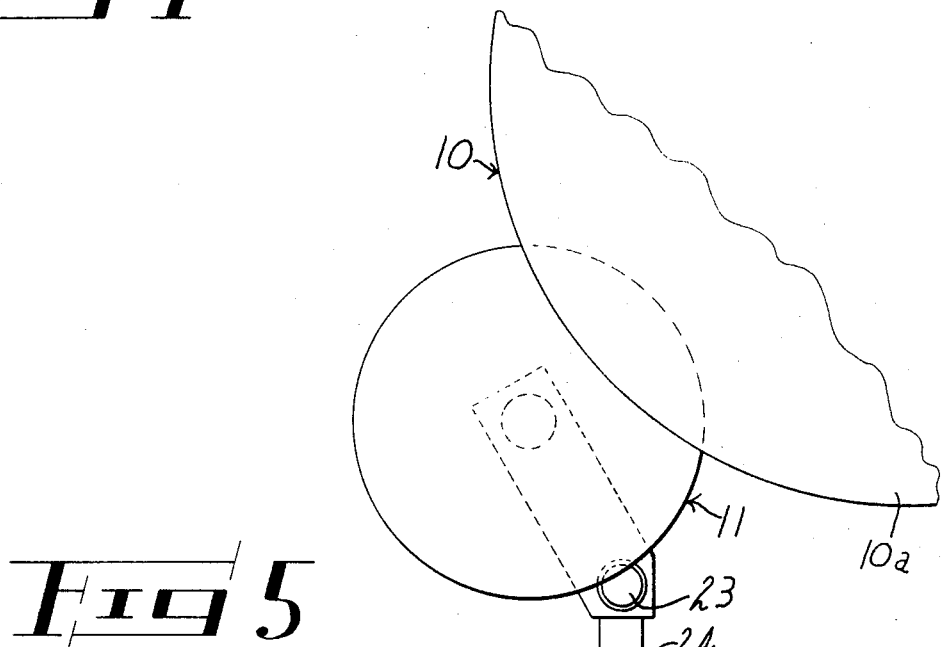
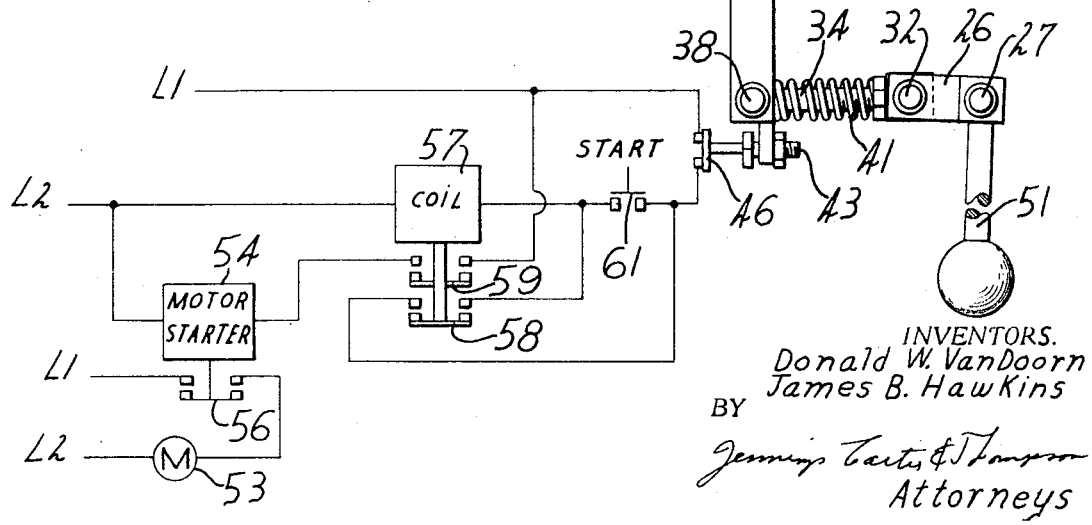

Patented July 10, 1973
3,744,361
4 Sheets-Sheet 4
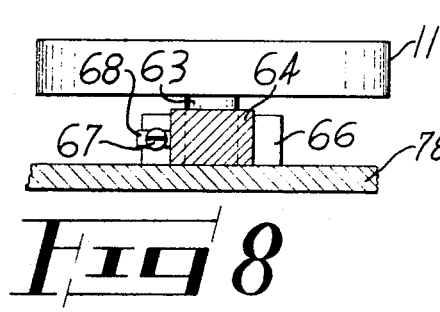
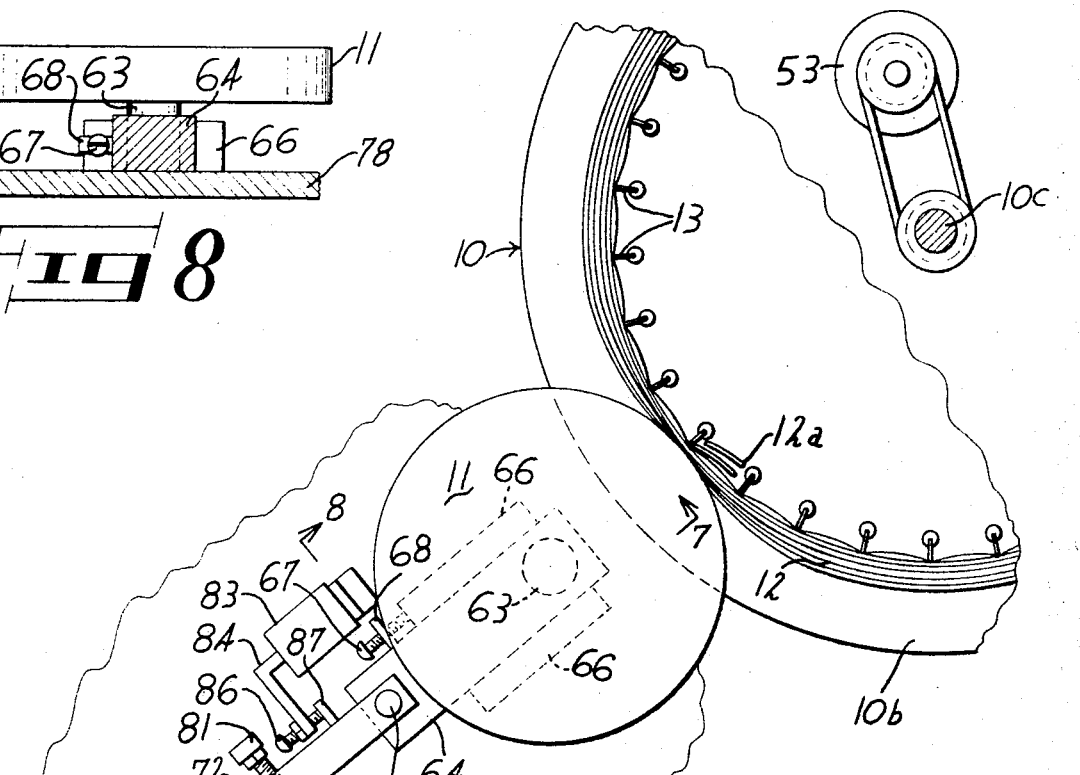
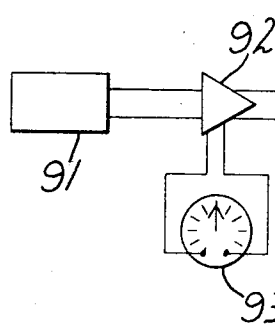
INVENTORS.
Donald W. VanDoorn
James B. Hawkins
BY
Jennings Carter & Thompson
Attorneys 3,744,361

PROCESS AND APPARATUS FOR CUTTING ELONGATED MATERIAL

Our invention relates to a process and apparatus for cutting material such as tow into short lengths and is an improvement on the process and apparatus shown, described and claimed in U.S. Pat. No. 3,485,120, Dec. 23, 1969.

In this art as taught by the above patent, continuous filamentary material such as tow may be cut into short, spinable lengths by wrapping the tow about a revolving reel carrying a plurality of radially and outwardly facing, equally spaced knives or cutters. A pressure roller is forced against the outer surface of the material wound about the reel so that the material is cut into short lengths from the inside of the coil or winding thereof. By using extremely sharp razor-like blades which are accurately equally spaced about the reel, uniform lengths of fibers are continuously cut as the apparatus revolves.

The foregoing principles of construction and operation have proven to be satisfactory. However, as shown in said patent the pressure applicator or roller is held to its work by rigid, unyielding means. This has brought about damage to the cutters when a knot or other enlargement in the tow passes between the cutters and the pressure roller, or when the machine becomes choked as when the cut material is not being carried away fast enough. Furthermore, as will later appear, such rigid holding of the pressure roller to its work does not admit of utilizing excessive pressure on the material to obtain a signal to monitor the performance of the cutting operation or order the machine to stop the cutting operation.

In our investigation into tthe principal aspects of cutting material in accordance with the principles of the above patent, we have discovered that it is desirable to mount the pressure roller so that:

a. it may be quickly moved into and out of operating position for blade changing, etc.; and, b. it is held movably in operating position, that is, brought into full pressure exerting position relative to the tow carrying cutter reel, but movable away from the same in response to the presence of more than the normal, desired cutting pressure.

With the foregoing in mind an object of our invention is to provide a process of operating apparatus of the character designated for cutting material into predetermined lengths which includes the steps of sensing the pressure developed between the pressure roller and material between the pressure roller and the cutter assembly, and to utilize this sensing or signal to monitor the operation of the apparatus or to stop the machine whenever the pressure exceeds a predetermined value, whereby the machine will be stopped whenever:

a. a knot or the like passes between the pressure roller and cutter;

b. the blades exceed a predetermined dullness value;

c. a blade is installed incorrectly, namely, backwards; or, d. the machine becomes choked with material.

Another object is to provide a process of cutting continuous tow or the like into short lengths which comprises pressing with up to a predetermined, maximum force on the outer surface of a roll of the tow to force its inner periphery into cutting engagement with a plurality of cutters as the roll of tow and the cutters rotate about a common center, and to utilize any increase in pressure above said predetermined maximum value which comes about due to any abnormal condition in the dynamic system to stop the operation.

Our invention contemplates apparatus of the character designated in which a pressure roller is mounted for movement toward and from the cutter assembly, there being a toggle joint operator for the same which breaks over center to hold the roller to its working position against a positive stop, together with resilient means in the force system of the operator movably to hold the pressure roller with up to a proper, maximum material cutting force, thus permitting the roller to move away from the material whenever for any reason more force than said predetermined force on the material develops, thus permitting the attainment of the advantages already mentioned.

A more specific object is to provide a control circuit for the motor which drives the apparatus and effective to stop the motor if excessive pressure develops between the pressure roller-material-cutter assembly.

Another object is to provide means to monitor the cutting operation through a signal which is indicative of the sharpness of the cutters, so that new cutters may be installed before those in use become so dull as improperly to cut the material.

Apparatus illustrating features of our invention and which may also be used for carrying out our improved process is illustrated in the accompanying drawings forming a part of this application in which:

FIG. 1 is a plan view, partly broken away and in section, and illustrating our improved apparatus in operating position;

FIG. 2 is a view generally similar to FIG. 1, but showing the pressure roller withdrawn from operative position;

FIG. 5 is a wholly diagrammatic view illustrating the control circuits with the pressure roller in operative position, and with the control circuit readied for starting the motor which drives the apparatus;

FIG. 6 is a plan view, partly broken away and in section, and illustrating a modified form of our invention;

FIG. 7 is a detail sectional view taken generally along line 7—7 of FIG. 6;

FIG. 8 is a detail sectional view along line 8—8 of FIG. 6; and

FIG. 9 is a diagrammatic view illustrating a form of apparatus which may be used to monitor and record the cutting operation.

Figure 3:
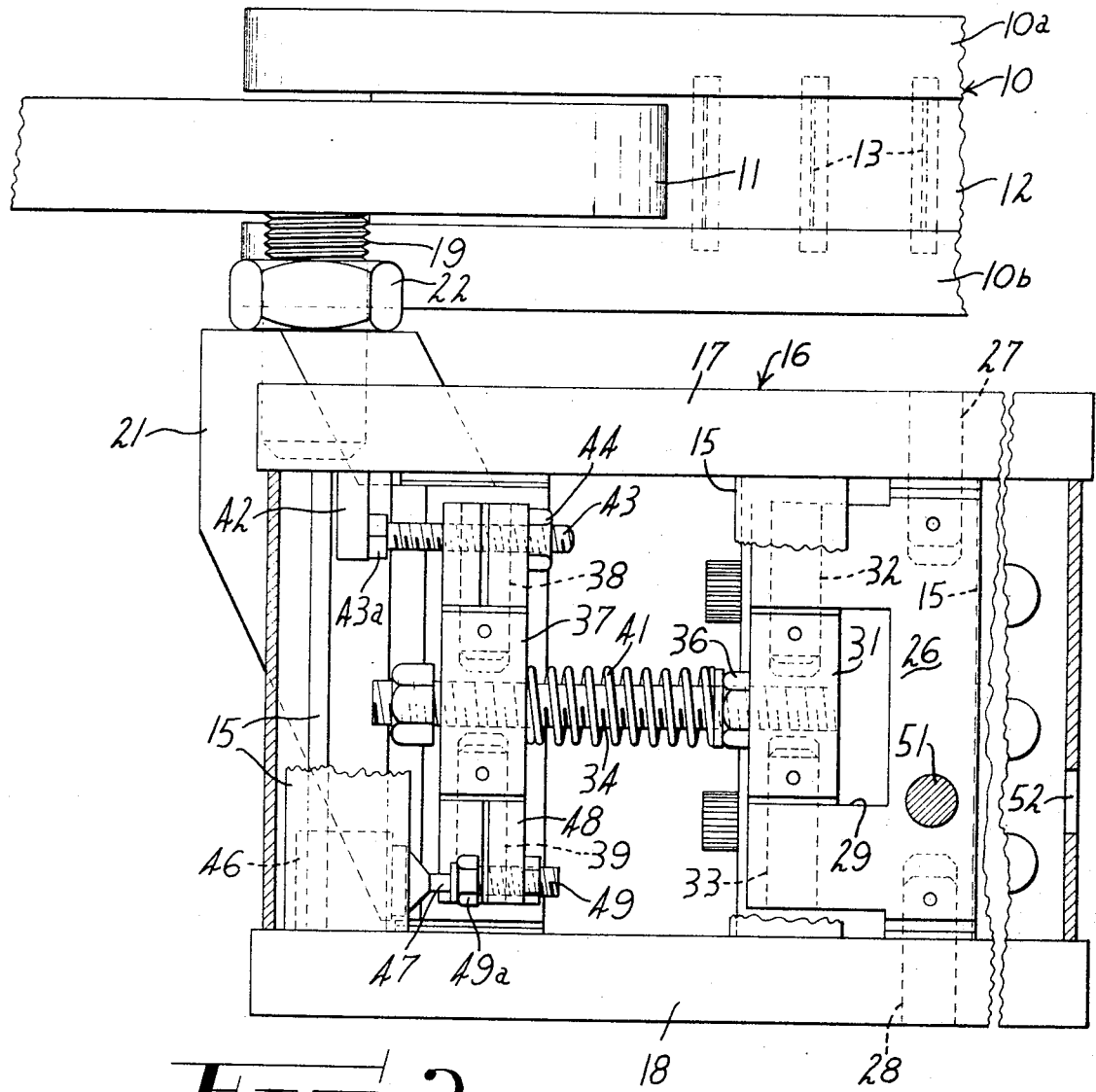
FIG. 3 is an enlarged detail view taken generally along line 3—3 of FIG. 1, certain of the parts being broken away and in section.
Figure 4:
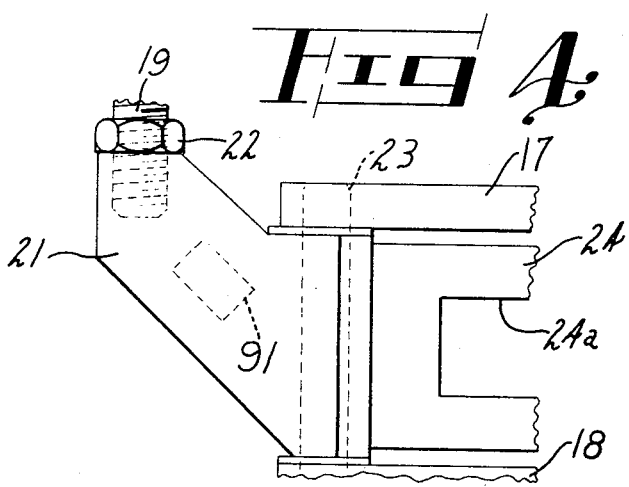
FIG. 4 is a fragmental detached view showing the pivotal support means for the pressure roller, the parts being broken away, the view being taken generally along the line 4—4 of FIG. 1.

Referring now to the drawings for a better understanding of our invention we show the same as embodying a motor drive, blade carrying reel indicated generally by the numeral 10 and a pressure roller 11 which is mounted for movement substantially radially toward and from reel 10. As is disclosed in U.S. Pat. No. 3,485,120, the material to be cut into short lengths is wound onto the reel 10 in successive layers as indicated at 12 and the reel carries a plurality of usually equally spaced, razor-like cutters 13 with their cutting edges outwardly directed. With the pressure roller held at a given, precise distance from the ends of the cutters the innermost layers of the material wound on the reel are cut and fall out as short lengths indicated at 12a, FIG. 1. The short, usable lengths 12a are conveyed away from the apparatus in the manner understood and as is well known and forms no part of our invention.

As before stated, in one aspect our invention comprises means to move the pressure roller 11 from the position shown in FIG. 1 to the position shown in FIG. 2, that is, from operative to inoperative positions, and to hold the same to its work, by the means hereinafter described.

The apparatus may be mounted on a frame member 14 and may comprise generally a housing 16 having a top frame plate 17 and a bottom frame plate 18. The bottom and top plates may be rather heavy to support the parts as will appear. Vertical members 15 tie the top and bottom plates together. However, the sides may be of relatively thin material.

The pressure roller 11 is supported on a vertically extending bearing pin 19. The bearing member 19 is threaded into the upper surface of a holder member 21. A lock nut 22 affords means for adjusting the pressure roller 11 vertically, thereby to assure that it fits properly between the flanges 10a and 10b of the reel 10, so that the material may be properly cut.

Member 21 is pivotally mounted on a pin 23 which is journaled in the upper and lower frame plates 17 and 18.

The pivoted member 21 has a horizontally extending, slotted section 24. As will appear, when the section 24 is moved horizontally, the portion 21 pivots about pin 23, moving thd pressure roller from the position shown in FIG. 1 to the position shown in FIG. 2.

The linkage for moving the roller 11 comprises first a block member 26 which is journaled between the frame members 17 and 18 by means of upper and lower pins 27 and 28.

The member 26 is slotted as indicated at 29 to receive a block 31. The block 31 is pivotally mounted in the slotted or bifurcated end of the block 26 by means of upper and lower pins 32 and 33.

Secured in the block 31 and projecting horizontally therefrom is a rod 34 having threaded sections at each end. As viewed in FIG. 1, the righthandmost end is threaded into the block 31 and is secured by a lock nut 36.

The end of the pin 34 opposite the block 31 passes loosely through a block 37. The block 37 iis pivotally mounted in the slotted or bifurcated end 24a of the extension 24, by means of pins 38 and 39.

Loosely surrounding the rod 34 is a compression spring 41.

Depending from the plate 17 is a lug 42. Passing threadedly through the section 24, between the pins 23 and 38, is a threaded stop member 43 held adjustably therein by means of a lock nut 44. The head 43a of the member 43 is adapted to contact the stop member as will be explained, thereby to limit movement of the pressure roller 11 toward the cutter assembly 10.

Mounted in the housing is a normally open electric switch 46 having an operating arm 47. A lug 48 mounted on the end of section 24 and outwardly of pin 38, carries an adjustable switch engaging pin 49 the head 49a of which is adapted, when the parts are in the position of FIG. 1, to close switch 46.

An operating handle 51 is secured to the block 26 and passes through suitable slots 52 in the side walls of the housing.

Referring now particularly to FIG. 5 we illustrate a suitable circuit, in diagrammatic form, for operating our apparatus. Thus, we illustrate at 53 the drive motor which is operatively connected to rotate the shaft 10c carrying the cutter assembly or reel 10 in the manner disclosed in said U.S. Pat. No. 3,485,120. This motor may be under control of the usual motor starter 54 having a set of line contacts 56 as shown. At 57 we illustrate the coil of a relay which has normally open sets of contacts 58 and 59. 61 illustrates a start button, of the momentary closable type, for controlling the starting of the motor. Therefore, with the parts in the position of FIG. 1, namely with the handle 51 moved to position the pressure roller 11 into working or operating position relative to the reel, the apparatus is readied for starting.

From what has been described it is now possible to further explain and understand our invention and the several advantages thereof. It will be seen that the various parts making up the linkage in effect form a toggle joint in which there are two fixed pivot points, namely, the pin 23 and the upper and lower pins 27 and 28. The pins 38–39 and 32–33 form floating pivots. With the handle 51 moved to the position of FIG. 1 it will be seen that the pins 32–33 break over center relative to the pins 27–28 and 38–39, thereby locking the pressure roller 11 in operating position. First, the amount of movement or distance that the pressure roller 11 moves into and toward the knives is determined by the setting of the stop bolt 43. Next, the roller 11 is held to its work by the force exerted by spring 41. Still further, with the parts in the position just illustrated and with the toggle joint broken over center, switch 46 is closed. Therefore, by momentarily pressing the start button 61 coil 57 is energized, closing contacts 58 and 59, establishing a holding circuit for the coil 57 and energizing the motor starter 54 through contacts 59.

It will be seen that the spring 41 can be selected to cause the roller 11 to exert a force to hold the bolt 43 against stop 42 with enough pressure on the material wound on the reel 10 to cause cutting on the lengths 12a, depending upon the material, the sharpness of the blades, and so forth. In the event a knot or other obstruction is wound onto reel 10, such excess pressure causes the roller 11 to overcome the force of spring 41, momentarily opening switch 46, and deenergizing relay 57. This stops motor 53, shutting down the entire apparatus.

One of the attributes of our improved process and apparatus is that when the blades become so dull as to improperly cut the lengths of material, the pressure between the roller-material-blades increases appreciably, namely, to the extend that it can be detected. That is to say, the dullness of the blades in the sense that they are inadequately sharp to cut the material properly causes a build up of pressure and this is sufficient to overcome the spring 41, and cause the apparatus to stop. This is true also in the event of a choke in the machine, that is, when the lengths are not taken away fast enough. Also, it sometimes happens that the blades 13 are inserted backwards, whereupon the excess pressure deenergizes the apparatus, warning the operator that something is wrong.

It will be noted that by adjusting the stop bolt 43 the closeness of the periphery of the pressure roller 11 to the cutting edges of the blades may be adjusted. Brining the stop bolt 43 into position to contact stop 42 causes rod 34 to move through the opening in block 37 so that the nut on the outer end of the rod stands away from that side of the block. Therefore, it is the stop 42 and stop bolt 43 which limit inward movement of the roller 11 toward the reel, and the roller is held in that position, but removably, by spring 41. Also, upon breaking over center block 26 contacts an edge of a side frame member as indicated at 62, thus to prevent handle 51 from moving further clockwise, as viewed in FIG. 2, thus holding the parts in a stabilized, operating position. When it is desired to move the roller 11 to inoperative position the only thing necessary is to shift the handle 51 counterclockwise as viewed in FIG. 1 in one uninterrupted motion, whereby the roller 11 is moved from FIG. 1 position to FIG. 2 position.

Referring now to FIGS. 6, 7 and 8, we show a slightly modified form of our invention in which the pressure roller is moved to its work rectilinearly, instead of arcuately. Thus, the pressure roller 11 is mounted for rotation on a pin 63 which projects upwardly from a slide block 64. The slide block may be held between guides 66 and the inward movement of the roller 11 toward the reel 10 may be regulated by means of a stop set screw 67. As shown, the screw 67 is threaded through a lug 68 projecting from a side of the slide 64 and the same may contact one of the guides 66.

Pivotally connected to slide 64 as at 69 is a link 71. Pivotally connected to the other end of the link as at 72 is a block 73. A rod 74 is threaded into the block 73 and passes slidably through another block 76. Block 76 is pivotally mounted on a pin 77 in a base plate 78 which supports the apparatus. A spring 79 is interposed between blocks 73 and 76.

A stop member 81 is upstanding from the plate 78. An adjustable stop nut 82 iis provided in the link 71.

A switch 83, corresponding to switch 46 has an arm 84 which carries an adjustable screw 86. The screw 86 is disposed to engage a lug 87 on the link 71. Switch 83 is a normally opened switch and is closed only when the parts are in the position of FIG. 6. A stop member 88 carried by the plate 78 prevents handle 89 from rotating counterclockwise as viewed in FIG. 6, under the influence of spring 79, when the parts are in the position of FIG. 6.

As stated, the operation of this modification is substantially the same as the one previously described. With the parts in the position of FIG. 6 pivot 72 is broken over center relative to pivots 77 and 69, whereby the spring 79 urges the pressure roller 11 to its work. The head of bolt 83 is in contact with top 81, limiting inward movement of the roller 11 and switch 83 is closed. Should any excess pressure come on the roller 11 due to knots, dull blades or the like, it moves rearwardly slightly, opening switch 83, deenergizing the drive motor. On the other hand, when it is desired to move the roller 11 away from the reel 10 handle 89 is moved clockwise as viewed in FIG. 6, breaking the pivot 72 over center and sliding the roller carrying block 64 in the guides 66. Suitable means, not shown, may be provided for holding the roller 11 down, that is, against vertical movement relative to the plate 78.

Referring to FIG. 9 we show apparatus suitable for monitoring and, if desired, for recording the cutting function.

By way of example it is possible to detect strain in several parts of the apparatus which is a function of the pressure between roller 11 and the material on the reel 10. Thus, we may secure a strain gauge 91 of the resistance type to a side of the member 21 which carries roller 11. This gauge is connected to a suitable amplifier 92 which in turn is connected to a visual instantaneously reading instrument such as a volt meter 93. If desired the amplifier may also drive the stylus 94 of a rotatable disc recording device 96.

The resistance of the gauge 91 changes with the increase in pressure exerted by or upon the roller 11. As the cutters become more dull with use the meter 93 indicates this fact and if the gauge reads a certain figure the operator knows to change the cutters. The recorder 96 may be used to make a daily or hourly record of the variation in cutting pressure and can provide a record useful in determining the life of the cutters, etc.

In view of the foregoing it will be seen that we have devised an improved process and apparatus for cutting continuous length material into short lengths. With either modification of our invention it will be seen that a signal is generated whenever more than a predetermined pressure is exerted on the pressure roller, for any reason. This signal is utilized to monitor or to stop the apparatus. At the same time, we attain ease of withdrawal of the pressure roller for the replacement of blades, cleaning, inspection, and so forth, of the cutter reel assembly.

When the cutters become so dull that the fiber is not cut cleanly, that is, squarely, small "tails" or semi-crushed ends result. Since these are objectionable it is advantageous to anticipate this condition so that new, sharp cutters may be installed. The ability to anticipate such approaching condition and to be able to prevent the production of short lengths with this defect is an important advantage of our invention. Since the kind of fiber being cut determines in part when the cutters must be changed, it is impossible to state precisely how much force spring 41 must exert in every case. However, it is a simple matter to select a spring which holds the pressure roller support firmly against the stop while cutting with a new, sharp set of cutters and then, when the defects commence to appear, to change the spring tension so that switch 46 opens just prior to the occurence of the defects.

While we have shown our invention in but two forms, it will be obvious to those skilled in the art that it is not so limited, but is susceptible of various other changes and modifications without departing from the spirit thereof.

What we claim is:

1. The process of cutting a continuous length of tow or the like into short lengths comprising,
   a. continuously winding the tow onto a rotating drum with the windings radially overlapping,
   b. cutting the layers of tow adjacent the drum into short lengths by exerting a cutting pressure on the outer windings of the tow on the drum, and
   c. sensing said cutting pressure.

2. The process of cutting a continuous length of tow or the like into short lengths comprising,
   a. continuously winding the tow onto a rotating drum with the windings radially overlapping, b. cutting the layers of the tow adjacent the drum into short lengths by exerting cutting pressure on the outer windings of the tow on the drum, c. sensing and cutting pressure, and d. recording said cutting pressure, thereby providing a record of the cutting pressure required.

3. The process of cutting a continuous length of tow or the like into short lengths comprising, a. continuously winding the tow onto a rotating drum with the windngs radially overlapping, b. cutting the layers of the tow adjacent the drum into short lengths by exerting cutting pressure on the outer windings of the tow on the drum, and c. sensing said cutting by means which indicates when the cutting pressure exceeds a predetermined value.

4. The process of cutting a continuous length of tow or the like into short lengths comprising, a. continuously winding the tow onto a rotating drum with the windings radially overlapping, b. cutting the layers of tow adjacent the drum into short lengths by exerting a cutting pressure on the outer windings of the tow on the drum, c. sensing an increase in said cutting pressure occasioned by a misfunction or malfunction of the cutting operation, and d. utilizing the sensing obtained in (c) above to stop the cutting operation.

5. The process of cutting a continuous length of tow or the like into short lengths comprising, a. continuously winding the tow onto a rotating drum with the windings radially overlapping, b. cutting the layers of tow adjacent the drum into short lengths by exerting a cutting pressure on the outer windings of the tow on the drum, c. sensing an increase in said cutting pressure occasioned by a misfunction or malfunction of the cutting operation, and d. utilizing the sensing obtained in (c) above to actuate a signaling device.

6. The process of operating apparatus for cutting material into predetermined lengths, which apparatus embodies a cutting assembly including reel mounted cutters, a pressure roller for forcing the material into cutting pressure engagement with the cutters, and means to hold the pressure roller into said cutting pressure engagement with the material, the steps of:

a. maintaining cutting pressure between the pressure roller and the material, and b. utilizing an increase in said pressure above a predetermined amount thereof to stop the cutting operation of said apparatus.

7. The process of claim 6 which comprises the specific step of utilizing the increase in pressure on said roller, when operating, which develops when the cutters exceed a predetermined dullness value to stop the cutting operation of said apparatus.

8. In apparatus for cutting material into predetermined lengths embodying a cutting assembly including reel mounted cutters and a pressure roller for forcing the material into cutting engagement with the cutters, the improvement comprising:

a. means mounting the ppressure roller for movement into and out of operative relation relative to the cutting assembly, b. operating means for moving the pressure roller into and out of operating position, c. resilient means operatively interposed between said operating means and said pressure roller and effective when the roller is in operating position to urge it into cutting contact with the material, d. means included in said operating means for the roller to hold it in operating position under the influence of said resilient means, and e. means associated with the operating means of said roller effective upon the existence of more than a predetermined amount of pressure between the roller and the material being cut to deenergize the apparatus.

9. In apparatus for cutting material into predetermined lengths embodying a cutting assembly including reel mounted cutters and a pressure roller for forcing the material into cutting engagement with the cutters, a. means mounting the pressure roller for movement into and out of operative relation relative to the cutting assembly, b. operating means for moving the pressure roller into and out of operating position, c. resilient means operatively interposed between said operating means and said pressure roller and effective when the roller is in operating position to hold it in contact with the material being cut, and d. means included in said operating means for the roller to hold it in operating position under the influence of said resilient means and also effective to apply the force of said resilient means a preset amount when the roller is in operating position, and further including a toggle linkage embodying one fixed and two floating pivots, said resilient means being interposed between said floating pivots, the relative arrangement of said pivots being such that one of the movable ones thereof moves past a line passing through the other movable pivot and the fixed pivot, thus to break the toggle joint over center and lock the pressure roller in operative position.

10. Apparatus as defined in claim 9 in which, when the toggle joint is in broken over center position, the movably mounted pressure roller is limited by stop means against more than predetermined movement toward the cutters and is held in such position by said resilient means for movement away from the cutters.

11. Apparatus for cutting continuous filamentary material into short lengths of the kind embodying a drum on which the material to be cut is wound, a plurality of cutters on the drum and a pressure roller for holding the material in cutting engagement with the cutters, the improvement comprising:

a. a linkage system supporting the pressure roller for movement into and out of operating position relative to the material on the drum, b. a handle operatively connected to the linkage system and so related thereto that a single, continuous movement of the handle moves the pressure roller from operating position to withdrawn, non-operating position, and vice versa, and c. means to hold the pressure roller in operating position with its periphery a predetermined distance from the periphery of the drum comprising a toggle joint in said linkage system, together with means to break said toggle joint over center when the handle moves to pressure roller operating position.

* * * * *